(12) United States Patent
Klein et al.

(10) Patent No.: US 12,148,927 B2
(45) Date of Patent: Nov. 19, 2024

(54) LITHIUM BATTERY AND USE OF A GERMANIUM ORGANYL-BASED ELECTROLYTE ADDITIVE AS AN ELECTROLYTE ADDITIVE THEREIN

(71) Applicants: Bayerische Motoren Werke Aktiengesellschaft, Munich (DE); Contemporary Amperex Technology Co., Limited, Ningde (CN)

(72) Inventors: Sven Klein, Oer-Erkenschwick (DE); Jan-Patrick Schmiegel, Münster (DE); Hao Jia, Münster (DE); Tobias Placke, Münster (DE); Martin Winter, Münster (DE); Jakub Reiter, Munich (DE); Lydia Terborg, Munich (DE); Quan Fan, Ningde (CN)

(73) Assignees: Bayerische Motoren Werke Aktiengesellschaft, Munich (DE); Contemporary Amperex Technology Co., Limited, Ningde (CN)

( * ) Notice: Subject to any disclaimer, the term of this patent is extended or adjusted under 35 U.S.C. 154(b) by 522 days.

(21) Appl. No.: 17/440,085

(22) PCT Filed: Mar. 29, 2019

(86) PCT No.: PCT/EP2019/058024
§ 371 (c)(1),
(2) Date: Sep. 16, 2021

(87) PCT Pub. No.: WO2020/200399
PCT Pub. Date: Oct. 8, 2020

(65) Prior Publication Data
US 2022/0190331 A1 Jun. 16, 2022

(51) Int. Cl.
*H01M 4/525* (2010.01)
*H01M 4/131* (2010.01)
(Continued)

(52) U.S. Cl.
CPC ........... *H01M 4/525* (2013.01); *H01M 4/131* (2013.01); *H01M 4/505* (2013.01);
(Continued)

(58) Field of Classification Search
CPC ...... H01M 4/131; H01M 4/505; H01M 4/525; H01M 10/052; H01M 10/0567;
(Continued)

(56) References Cited

U.S. PATENT DOCUMENTS

| | | | |
|---|---|---|---|
| 6,677,082 B2 | 1/2004 | Thackeray | |
| 6,680,143 B2 | 1/2004 | Thackeray | |

(Continued)

FOREIGN PATENT DOCUMENTS

| | | |
|---|---|---|
| CN | 1501539 A | 6/2004 |
| CN | 101243576 A | 8/2008 |

(Continued)

OTHER PUBLICATIONS

JP2003173816a, Yamada, et al. "Nonaqueous electrolyte and nonaqueous electrolyte secondary battery using it", machine English translation retrieved from https://worldwide.espacenet.com/ Date: Feb. 27, 2024 (Year: 2003).*

(Continued)

*Primary Examiner* — Matthew T Martin
*Assistant Examiner* — Jared Hansen
(74) *Attorney, Agent, or Firm* — Nixon Peabody LLP (57) ABSTRACT

A lithium battery including an anode having an active anode material, a cathode having an active cathode material. The cathode material includes lithium nickel cobalt manganese cobalt oxide (NCM). An electrolyte separates the anode and cathode. The electrolyte includes a solvent or solvent mixture and lithium hexafluorophosphate, and a germanium organyl-based electrolyte additive. Also disclosed are uses of the germanium organyl-based electrolyte additive in the (Continued)

lithium battery for enhancing one characteristic selected from the group consisting of reversible capacity, Coulombic efficiency, cyclic stability and combinations thereof.

20 Claims, 1 Drawing Sheet

(51) Int. Cl.
   *H01M 4/505*      (2010.01)
   *H01M 10/052*     (2010.01)
   *H01M 10/0567*    (2010.01)
   *H01M 10/0568*    (2010.01)
   *H01M 10/0569*    (2010.01)

(52) U.S. Cl.
   CPC ..... *H01M 10/052* (2013.01); *H01M 10/0567* (2013.01); *H01M 10/0568* (2013.01); *H01M 10/0569* (2013.01); *H01M 2300/0028* (2013.01)

(58) Field of Classification Search
   CPC ......... H01M 10/0568; H01M 10/0569; H01M 2300/0025; H01M 2300/0028; H01M 2300/0037; H01M 2300/0045
   See application file for complete search history.

(56) References Cited

U.S. PATENT DOCUMENTS

| | | | |
|---|---|---|---|
| 7,205,072 | B2 | 4/2007 | Kang |
| 2004/0096737 | A1 | 5/2004 | Han-Su |
| 2009/0280404 | A1 | 11/2009 | Koji |
| 2013/0260241 | A1 | 10/2013 | Takuo |
| 2020/0091554 | A1 | 3/2020 | Matsuoka |
| 2020/0313236 | A1* | 10/2020 | Morinaka ......... H01M 10/0568 |

FOREIGN PATENT DOCUMENTS

| | | | | |
|---|---|---|---|---|
| EP | 1202373 | A2 | 5/2002 | |
| JP | H10 69915 | A | 3/1998 | |
| JP | 2003173816 | A * | 6/2003 | ......... H01M 10/052 |
| JP | 2003-323915 | A | 11/2003 | |
| JP | 2004-172121 | A | 6/2004 | |
| JP | 2008-004349 | A | 1/2008 | |
| JP | 2008146963 | A | 8/2008 | |
| JP | 2010-157473 | A | 7/2010 | |
| WO | 2007023700 | A1 | 3/2007 | |
| WO | WO 2012/073678 | A1 | 6/2012 | |
| WO | WO 2014/015335 | A1 | 1/2014 | |
| WO | WO 2018/169029 | A1 | 9/2018 | |
| WO | WO 2018/224167 | A1 | 12/2018 | |

OTHER PUBLICATIONS

Chen, Lang, et al. "Dimethoxydiphenylsilane (DDS) as overcharge protection additive for lithium-ion batteries." Journal of power sources 244 (2013): 499-504 (Year: 2013).*

Examination Report in related Japanese Patent Application No. 2021-553796, in Japanese, dated Oct. 4, 2023 (4 pages).

International Search Report and Written Opinion of International Searching Authority corresponding to International Patent Application No. PCT/EP2019/058024, mailed Dec. 9, 2019 (14 pages).

Bo Xu et al.; "Recent progress in cathode materials research for advanced lithium ion batteries"; Materials Science and Engineering R 73, pp. 51-65; Jun. 5, 2012 (15 pages).

Wei-Jun Zhang; "A review of the electrochemical performance of alloy anodes for lithium-ion batteries"; Journal of Power Sources, vol. 196, pp. 13-24; 2011 (12 pages).

Zhang, R.F et al.; "Synthesis and antitumor activity of diphenylgermanium heterocyclic carboxylates"; Chinese Journal of Organic Chemistry, vol. 21, Issue 1, pp. 41-44; with English abstract and partial translation (5 pages).

* cited by examiner

1st cycle potential profile:

LITHIUM BATTERY AND USE OF A GERMANIUM ORGANYL-BASED ELECTROLYTE ADDITIVE AS AN ELECTROLYTE ADDITIVE THEREIN

CROSS-REFERENCE TO RELATED APPLICATIONS

This application is a U.S. National Stage of International Application No. PCT/EP2019/058024, filed Mar. 29, 2019, which is incorporated herein by reference in its entirety.

The present invention relates to a lithium battery and use of a germanium organyl-based electrolyte additive as an electrolyte additive therein.

Conceptually, there should be no net chemical changes during the operation of the battery in the electrolyte, and all Faraday processes should be performed within the electrodes. Therefore, the electrolyte can be regarded as an inert component in the battery, and therefore must be stable both against cathode and anode surfaces. This electrochemical stability of the electrolyte, which is usually realized in a kinetic (passivation) and not a thermodynamic manner in actual devices, is of particular importance for rechargeable battery systems, even though these are difficult to fulfil because of the strong oxidizing and reducing nature of the cathode and anode.

A basic prerequisite for the components used in the electrolyte for lithium-ion batteries, especially solvents, is therefore that they are anhydrous or more precisely aprotic; that is, the solvent must not contain active protons which can react with lithium and/or other cell components. In addition, the solvent should be in a liquid state in the service temperature range.

A disadvantage of conventional electrolytes based on lithium hexafluorophosphate in carbonates for lithium-ion batteries is in particular the low oxidative stability of 4.5 V against Li/Li$^+$. The electrolyte is stable only up to this potential, whereas outside this range the oxidative decomposition of the electrolyte and associated degradation of the cathode material occur.

Lithium-nickel-manganese-cobalt oxides, also referred to as "NMC" or "NCM" ("NCM" will be used in the following), are one preferred cathode active material for lithium-ion batteries with a high energy density or high power density. However, also in this case decomposition of the electrolyte and the degradation of the cathode material occurs at 4.4 V. The result is a low cycle stability and therefore battery life.

The object of the present invention is to provide a lithium battery with improved stability.

This object is achieved according to the invention in a first aspect by a lithium battery according to claim 1, in a second aspect by the use of the germanium organyl-based electrolyte additive in a lithium battery as defined in the first aspect according to claim 10. Preferred embodiments are shown in the dependent claims.

The following definitions apply, if applicable, to all aspects of the invention.

Lithium Battery

According to the present invention, the terms "lithium battery", "lithium ion battery", "rechargeable lithium ion battery" and "lithium ion secondary battery" are used synonymously. The terms also include the terms "lithium-ion accumulator" and "lithium-ion cell" as well as all lithium or alloy batteries. Thus, the term "lithium battery" is used as a generic term for the aforementioned terms used in the prior art. It means both rechargeable batteries (secondary batteries) as well as non-rechargeable batteries (primary batteries). In particular, a "battery" for the purposes of the present invention also comprises a single or only "electrochemical cell". Preferably, two or more such electrochemical cells are connected together in a "battery", either in series (i.e., successively) or in parallel.

Electrodes

The electrochemical cell according to the invention has at least two electrodes, i. e. a positive (cathode) and a negative electrode (anode).

Both electrodes each have at least one active material. This is capable of absorbing or emitting lithium ions and at the same time absorbing or emitting electrons.

The term "positive electrode" means the electrode which, when the battery is connected to a load, for example to an electric motor, is capable of receiving electrons. It is the cathode in this nomenclature.

The term "negative electrode" means the electrode which is capable of emitting electrons during operation. It represents the anode in this nomenclature.

The electrodes comprise inorganic material or inorganic compounds or substances which can be used for or in or on an electrode or as an electrode. These compounds or substances can, under the working conditions of the lithium-ion battery, accept (insert) and also release lithium ions due to their chemical nature. In the present specification, such material is referred to as "active cathode material" or "active anode material" or generally "active material". For use in an electrochemical cell or battery, this active material is preferably applied to a support or carrier, preferably to a metallic support, preferably aluminum for the cathode or copper for the anode. This support is also referred to as a "collector" or collector film.

Cathode (Positive Electrode)

According to the present invention, the active material for the positive electrode or active cathode material comprises or preferably consists of nickel manganese cobalt oxide (NCM) having the general formula (LiNi$_x$Co$_y$Mn$_{1-x-y}$O$_2$) with each of x and y not including zero and x+y being smaller than 1. By changing the content of each transition metal, for example, LiNi$_x$Co$_y$Mn$_{1-x-y}$O$_2$ selected from the group consisting of LiNi$_{1/3}$Co$_{1/3}$Mn$_{1/3}$O$_2$ (NCM-111) LiNi$_{0.5}$Co$_{0.2}$Mn$_{0.3}$O$_2$ (NCM-523) LiNi$_{0.6}$Co$_{0.2}$Mn$_{0.2}$O$_2$ (NCM-622), LiNi$_{0.7}$Co$_{0.15}$O$_2$, LiNi$_{0.8}$Co$_{0.1}$Mn$_{0.1}$O$_2$ (NCM-811), LiNi$_{0.85}$Co$_{0.075}$Mn$_{0.075}$O$_2$ and mixtures thereof can be used.

The active material may also contain mixtures of the above active cathode material with a second or more of, for example, one of the following active cathode materials.

More specifically, as the second active material for the positive electrode or active cathode material all materials known from the related art can be used. These include, for example, LiCoO$_2$, NCA, high-energy NCM or HE-NCM, lithium-iron phosphate (LFP), Li-Manganese spinel (LiMn$_2$O$_4$), Li-Manganese nickel oxide (LMNO) or lithium-rich transition metal oxides of the type (Li$_2$MnO$_3$)$_x$ (LiMO$_2$)$_{1-x}$. Preferably, a material selected from a group consisting of a lithium-transition metal oxide (hereinafter also referred to as "lithium metal oxide"), layered oxides, spinels, olivine compounds, silicate compounds, and mixtures thereof is used as such a second active cathode material. Such active cathode materials are described, for example, in Bo Xu et al. "Recent progress in cathode materials research for advanced lithium ion batteries", Materials Science and Engineering R 73 (2012) 51-65. Another preferred cathode material is HE-NCM. Layered oxides and HE-NCM are also described in the patents U.S. Pat. Nos.

6,677,082 B2, 6,680,143 B2 and U.S. Pat. No. 7,205,072 B2 of Argonne National Laboratory.

Examples of olivine compounds are lithium phosphates of the sum formula $LiXPO_4$ with X=Mn, Fe, Co or Ni, or combinations thereof.

Examples of lithium metal oxide, spinel compounds and layered oxides are lithium manganate, preferably $LiMn_2O_4$, lithium cobaltate, preferably $LiCoO_2$, lithium nickelate, preferably $LiNiO_2$, or mixtures of two or more of these oxides or mixed oxides thereof.

In order to increase the electrical conductivity, further compounds may be present in the active material, preferably carbon-containing compounds, or carbon, preferably in the form of conductive carbon black or graphite. The carbon can also be introduced in the form of carbon nanotubes. Such additives are preferably applied in an amount of from 0.1 to 10% by weight, preferably from 1 to 8% by weight, based on the mass of the positive electrode applied to the support.

Anode (Negative Electrode)

The active material for the negative electrode or active anode material can be any of the materials known from the related art. Thus, according to the present invention there is no limitation with regard to the negative electrode. In particular, it is also possible to use mixtures of different active anode materials.

The active anode material may be selected from the group consisting of lithium metal oxides, such as lithium titanium oxide, metal oxides (e.g. $Fe_2O_3$, ZnO, $ZnFe_2O_4$), carbonaceous materials such as graphite (synthetic graphite, natural graphite) graphene, mesocarbon, doped carbon, hard carbon, soft carbon, fullerenes, mixtures of silicon and carbon, silicon, lithium alloys, metallic lithium and mixtures thereof. Niobium pentoxide, tin alloys, titanium dioxide, tin dioxide, silicon or oxides of silicon can also be used as the electrode material for the negative electrode.

The active anode material may also be a material alloyable with lithium. This may be a lithium alloy or a non-lithiated or partially lithiated precursor to this, resulting in a lithium alloy formation. Preferred lithium-alloyable materials are lithium alloys selected from the group consisting of silicon-based, tin-based and antimony-based alloys. Such alloys are described, for example, in the review article W.-J. Zhang, Journal of Power Sources 196 (2011) 13-24.

Electrode Binders

The materials used for the positive or for the negative electrode, such as the active materials, are held together by one or more binders which hold these materials on the electrode or on the current collector.

The binder(s) may be selected from the group consisting of polyvinylidene fluoride (PVdF), polyvinylidene fluoride-hexa-fluoro-propylene co-polymer (PVdF-HFP) polyethylene oxide (PEO), polytetrafluoroethylene, polyacrylate, styrene-butadiene rubber (SBR), and (sodium-)carboxymethylcellulose (CMC), and mixtures and copolymers thereof. Styrene-butadiene rubber and optionally carboxymethylcellulose and/or the other binders such as PVdF are preferably present in an amount of 0.5-8% by weight based on the total amount of the active material used in the positive or negative electrode.

Separator

The lithium battery according to the invention preferably has a material which separates the positive electrode and the negative electrode from each other. This material is permeable to lithium ions, i.e. it emits lithium ions, but is a non-conductor for electrons. Such materials used in lithium ion batteries are also referred to as separators.

In a preferred embodiment within the meaning of the present invention, polymers are used as separators. In one embodiment, the polymers are selected from the group consisting of: cellulose, polyester, preferably polyethylene terephthalate; polyolefin, preferably polyethylene, polypropylene; polyacrylonitrile; polyvinylidene fluoride; polyvinylidene hexafluoropropylene; polyetherimide; polyimide, polyether; polyether ketone or mixtures thereof.

The separator has porosity so that it is permeable to lithium ions. In a preferred embodiment within the meaning of the present invention, the separator consists of at least one polymer.

Electrolyte

The term "electrolyte" preferably means a liquid in which a lithium conducting salt is dissolved, preferably the liquid is a solvent for the conducting salt, and the Li conductive salt is preferably present as an electrolyte solution. According to the present invention $LiPF_6$ is used as lithium conductive salt. It is possible to use a second or more conductive salts, such as $LiBF_4$.

The two aspects of the present invention will be described in more detail below.

In a first aspect, the present invention relates to a lithium battery comprising an anode comprising an active anode material, a cathode comprising an active cathode material comprising lithium nickel manganese cobalt oxide $LiNi_xM$-$n_yCo_zO_2$ (NCM), wherein $0<x<1$, $0<y<1$, $0<z<1$, and $x+y+z=1$ (alternatively, the general formula ($LiNi_xCo_yMn_{1-x-y}O_2$) with each of x and y not including zero and x+y being smaller than 1 can be used), a separator separating anode and cathode, and an electrolyte, wherein the electrolyte comprises a solvent or solvent mixture and lithium hexafluorophosphate, wherein the electrolyte further comprises a germanium organyl-based electrolyte additive.

Surprisingly, it has been found that the lithium battery according to the present invention comprising NCM as active cathode material and the germanium organyl-based electrolyte additive, compared to the electrolyte without additive, exhibits higher cycle stability and service life. In addition, degradation of the cathode material is suppressed. Finally, a lower self-discharge occurs.

Without being bound to a theory, it is believed that the presence of the germanium organyl-based electrolyte additive in the electrolyte leads to an increase of the lithiation/delithiation potential of the cathode, expressed by an overpotential in the first and ongoing cycles. Upon cycling up to 4.55 V, the cells containing 0.05 wt. % of the germanium organyl-based electrolyte additive show a superior cycling stability in comparison to those with the plain reference electrolyte.

The germanium organyl-based electrolyte additive is therefore advantageously suitable as an additive for $LiPF_6$-containing electrolytes for commercial lithium-ion batteries based on NCM active cathode materials.

Preferably, the germanium organyl-based electrolyte additive is a compound of formula 1 wherein X is Ge; Y1 and Y2 are independently $(CH_2)_m$ with m being 0, 1 or 2; and $Z_1$ and $Z_2$ are independently selected from the group consisting of nitrile, a substituted or unsubstituted C6- to C14-aryl, and a substituted or unsubstituted C5-C12 heteroaryl with the heteroatom selected from O, N, and S, wherein the optional substituent is selected from the group consisting of C1 to C9 alkyl, and C1 to C9 alkoxyl.

More preferably, the germanium organyl-based electrolyte additive is selected from the group consisting of the following formulas 2 to 19, with X being Ge, and R being C1 to C9 alkyl, or C1 to C9 alkoxyl:

formula 2 formula 3 formula 4 formula 5 formula 6 formula 7 formula 8 formula 9 formula 10 formula 11

-continued formula 12 formula 13 formula 14 formula 15 formula 16 formula 17

-continued formula 18 and formula 19 and a mixture thereof.

In particular, the germanium organyl-based electrolyte additive is 3,3'-((diphenylgermanediyl)bis(oxy))dipropanenitrile (DGDP) of formula 2 formula 2

Preferably, the electrolyte according to the invention comprises the germanium organyl-based electrolyte additive, dissolved in an organic solvent. The electrolyte is, for example, obtainable by introducing and dissolving lithium hexafluorophosphate and the germanium organyl-based additive into a solvent or a solvent mixture. Alternatively, the germanium organyl-based electrolyte additive can be mixed with the cathode active material when producing the cathode. This also leads to the dissolution of the germanium organyl-based electrolyte additive into the electrolyte and the formation of a cathode passivation layer or cathode-electrolyte-interphase (CEI) on the NCM active cathode material.

In preferred embodiments, from 0.01 to 10% by weight, preferably from 0.1 to 5% by weight, preferably from 0.2 to 1% by weight, in particular from 0.25 to 0.75% by weight of the germanium organyl-based electrolyte additive, in terms of the amount of electrolyte used comprising lithium hexafluorophosphate in a solvent or solvent mixture.

In preferred embodiments, the concentration of lithium hexafluorophosphate in the electrolyte is in the range from >0.1 M to <2 M, preferably in the range from >0.5 M to <1.5 M, particularly preferably in the range from >0.7 M to <1.2 M. In a particularly preferred embodiment, the concentration of lithium hexafluorophosphate in the electrolyte is 1 M. In preferred embodiments, the electrolyte comprises an organic solvent, an ionic liquid and/or a polymer matrix. Preferably, the electrolyte comprises lithium hexafluorophosphate, a germanium organyl-based electrolyte additive, and an organic solvent. It has been found that the germanium organyl-based electrolyte additive has good solubility in organic solvents, especially in cyclic and/or linear carbonates. This advantageously allows the use of the germanium organyl-based electrolyte additive in $LiPF_6$-containing liquid electrolytes.

In preferred embodiments, the organic solvent is selected from the group consisting of ethylene carbonate (EC), propylene carbonate (PC), diethyl carbonate (DEC), dimethyl carbonate (DMC), ethyl methyl carbonate (EMC), acetonitrile, glutaronitrile, adiponitrile, pimelonitrile, gamma-butyrolactone, gamma-valerolactone, dimethoxyethane, dioxalane, methyl acetate, ethyl methane sulfonate, dimethyl methyl phosphonate and/or mixture thereof. Suitable organic solvents are, in particular, selected from the group consisting of cyclic carbonates such as ethylene carbonate and propylene carbonate and linear carbonates such as diethyl carbonate, dimethyl carbonate and ethyl methyl carbonate and mixtures thereof.

Preferably the organic solvent is selected from the group consisting of ethylene carbonate, diethyl carbonate, dimethyl carbonate, ethyl methyl carbonate and mixtures thereof. A preferred solvent is ethylene carbonate. Ethylene carbonate is also referred to as 1,3-dioxolan-2-one according to the IUPAC nomenclature. Ethylene carbonate is commercially available. Ethylene carbonate has a high boiling point and a high flame point. It is also advantageous that ethylene carbonate allows a high conductivity due to a good salt dissociation.

In a preferred embodiment, the organic solvent comprises a mixture of ethylene carbonate and at least one further organic solvent. Preference is also given to binary mixtures of carbonates, in particular of ethylene carbonate, with a further carbonate, for example diethyl carbonate, dimethyl carbonate and/or ethyl methyl carbonate, in particular ethyl methyl carbonate.

The ratio of ethylene carbonate and the at least one further organic solvent, preferably ethyl methyl carbonate, is preferably in the range from >1:99 to <99:1, preferably in the range from >1:9 to <9:1:7 to 1:1. If not stated differently, the ratio indicated relates to the weight parts of the solvents. A high conductivity in a temperature range from −25° C. to +60° C. was advantageously achieved in a solvent mixture of ethylene carbonate and ethyl methyl carbonate in the ratio 3:7.

Preference is also given to ternary mixtures comprising at least one carbonate as solvent. Particular preference is given to mixtures of ethylene carbonate with a further solvent, for example ethyl methyl carbonate, and a compound which is suitable for forming a so-called solid electrolyte interphase (SEI). The electrolyte can therefore also comprise additives, in particular film-forming electrolyte additives. In preferred embodiments, the electrolyte comprises a compound selected from the group consisting of chloroethylene carbonate, fluoroethylene carbonate, vinylene carbonate, vinyl ethylene carbonate, ethylene sulfite, ethylene sulfate, propane sulfonates, sulfites, preferably dimethyl sulfite and propylene sulfite, sulfates, butyrolactones, phenylethylene carbonate, vinyl acetate and trifluoropropylene carbonate. Among the compounds based on carbonate, chlorine-substituted or fluorine-substituted carbonates are preferred, in particular fluoroethylene carbonate (FEC). The additives can improve the battery performance, for example the capacity or the cycle life. In particular, fluoroethylene carbonate can lead to improved long-term stability of a cell.

Preferably, the electrolyte contains at least one further additive, in particular a compound selected from the group consisting of chloroethylene carbonate, fluoroethylene carbonate, vinylene carbonate, vinyl ethylene carbonate, ethylene sulfite, ethylene sulfate, propane sulfonates, sulfites, preferably dimethyl sulfite and propylene sulfite, sulfates, butyrolactones optionally substituted by F, Cl or Br, phenylethylene carbonate, vinyl acetate, trifluoropropylene carbonate and mixtures thereof, preferably fluoroethylene carbonate, in the range from >0.1% by weight to <10% by weight, preferably in the range from >1% by weight to <5%, more preferably in the range from >2% by weight to <3% by weight, based on the total weight of the electrolyte.

The organic solvent preferably comprises a mixture of ethylene carbonate and at least one further organic solvent, preferably selected from the group consisting of linear carbonates, in particular ethyl methyl carbonate, and fluoroethylene carbonate.

Thus, fluoroethylene carbonate can form a protective layer on a graphite anode and reduce excess potentials of the electrode. Ionic liquids have also proved to be very promising solvents because they combine a high thermal as well as electrochemical stability with a high ionic conductivity. In particular, this is advantageous for use with lithium-2-methoxy-1, 2,2-tetrafluoro-ethanesulfonate. Preferred ionic liquids include a cation selected from the group consisting of 1,2-dimethyl-3-propylimidazolium (DMPI+), 1,2-diethyl 3,5-dimethylimidazolium (DEDMI+), N-alkyl-N-methylpiperidinium (PIPIR+), N-alkyl-N-methylmorpholinium (MORPIR+) and mixtures thereof and an anion selected from the group consisting of trimethyl-n-hexylammonium (TMHA+) and N-alkylpyrrolidinium comprising bis (trifluoromethanesulfonyl) imide (TFSI), bis (pentafluoroethanesulfonyl) imide (BETI), bis (fluorosulfonyl) imide (FSI), 2,2,2-trifluoro-N-(trifluoromethanesulfonyl) acetamide (TSAC) Tetrafluoroborate (BF4-), pentafluoroethane trifluoroborate ($C_2F_5BF_3$—), hexafluorophosphate ($PF_6$—), tris (pentafluoroethane) trifluorophosphate (($C_2F_5$) $3PF_3$—), and mixtures thereof. Preferred N-alkyl-N-methylpyrrolidinium (PYRIR+) cations are selected from the group consisting of N-butyl-N-methylpyrrolidinium (PYR14+), N-methyl-N-propylpyrrolidinium (PYR13+) and mixtures thereof.

Preferred ionic liquids are selected from the group consisting of N-butyl-N-methylpyrrolidinium bis (trifluoromethanesulfonyl) imide ($PYR_{14}TFSI$), N-methyl-N-propylpyrrolidinium bis (trifluoromethanesulfonyl) imide ($PYR_{13}TFSI$), and mixtures thereof.

Further suitable electrolyte materials are polymer electrolytes, where the polymer electrolyte can be present as gel polymer electrolyte or solid polymer electrolyte. Solid polymer electrolytes exhibit good properties with regard to the requirements for future accumulator generations. They allow for a solvent-free construction, which is easy to manufacture and manifold in shape. In addition, the energy density can be increased since the three-layer structure made of electrolyte separator electrolyte is omitted so that only a thin polymer film is required between the electrodes. Solid electrolytes are generally chemically and electrochemically stable to electrode materials and do not escape from the cell. Gel polymer electrolytes usually comprise an aprotic solvent and a polymer matrix.

Preferred polymers for solid polymer electrolytes and gel polymer electrolytes are selected from the group consisting of homo- or copolymers of polyethylene oxide (PEO), polypropylene oxide (PPO), polyvinylidene fluoride (PVdF), polyvinylidenefluoridehexafluoropropylene (PVdF-HFP), polyacrylonitrile (PAN), polymethylmethacrylate (PMMA), Polyethylmethacrylate (PEMA), polyvinyl acetate (PVAc), polyvinyl chloride (PVC), polyphophazenes, polysiloxanes, polyvinyl alcohol (PVA), homo- and (block) copolymers comprising functional side chains selected from the group consisting of ethylene oxide, propylene oxide, acrylonitrile, siloxanes and mixtures thereof.

According to the present invention, the active material for the positive electrode or active cathode material comprises or preferably consists of lithium nickel manganese cobalt oxide $LiNi_xMn_yCo_zO_2$ (NCM), wherein $0<x<1$, $0<y<1$, $0<z<1$, and $x+y+z=1$. Alternatively, the general formula $(LiNi_xCo_yMn_{1-x-y}O_2)$ with each of x and y not including zero and x+y being smaller than 1 can be used. $LiNi_xCo_yMn_{1-x-y}O_2$ materials with $0.3x<1$ are preferred, such as materials selected from the group consisting of $LiNi_{1/3}Co_{1/3}Mn_{1/3}O_2$ (NCM-111), $LiNi_{0.5}Co_{0.2}Mn_{0.3}O_2$ (NCM-523), $LiNi_{0.6}Co_{0.2}Mn_{0.2}O_2$ (NCM-622), $LiNi_{0.7}Co_{0.15}Mn_{0.15}O_2$, $LiNi_{0.8}Co_{0.1}Mn_{0.1}O_2$ (NCM-811), $LiNi_{0.85}Co_{0.075}Mn_{0.075}O_2$ and mixtures thereof. More preferred are Ni-rich NMCs with $0.5 \leq x<1$ due to their higher specific capacity of 180-190 mAh g$^{-1}$ at the upper cut-off potential of 4.3 V vs. Li/Li$^+$, with NCM-622 and NCM-811 being still more preferred and NCM-811 being in particular preferred.

In addition, a disproportionation and dissolution of manganese, as well as other transition metals, from the active cathode material can be further kinetically inhibited in the NCM-cathode active materials by the addition of lithium 2-pentafluoroethoxy-1,1,2-tetrafluoroethane sulfonate to the electrolyte containing LiPF$_6$.

In preferred embodiments, the anode comprises an active anode material selected from a group consisting of carbon, graphite, mixtures of silicon and carbon/graphite, silicon, lithium, lithium metal oxide, lithium-alloyable materials, and mixtures thereof. Graphite is particularly preferred.

In a second aspect of the invention, the present invention is directed to the use of the germanium organyl-based electrolyte additive as additive in a lithium battery as defined in the first aspect of the present invention for enhancing one characteristic selected from the group consisting of reversible capacity, Coulombic efficiency ($C_{Eff}$), cyclic stability, capacity retention, and combinations thereof.

The lithium-ion battery according to the invention is suitable for all uses in all high-energy, long-life applications, such as electric vehicles and energy storage systems, in particular in automotives, because of its high-voltage stability.

Examples and Figures which serve to illustrate the present invention are given below.

Figure 1:
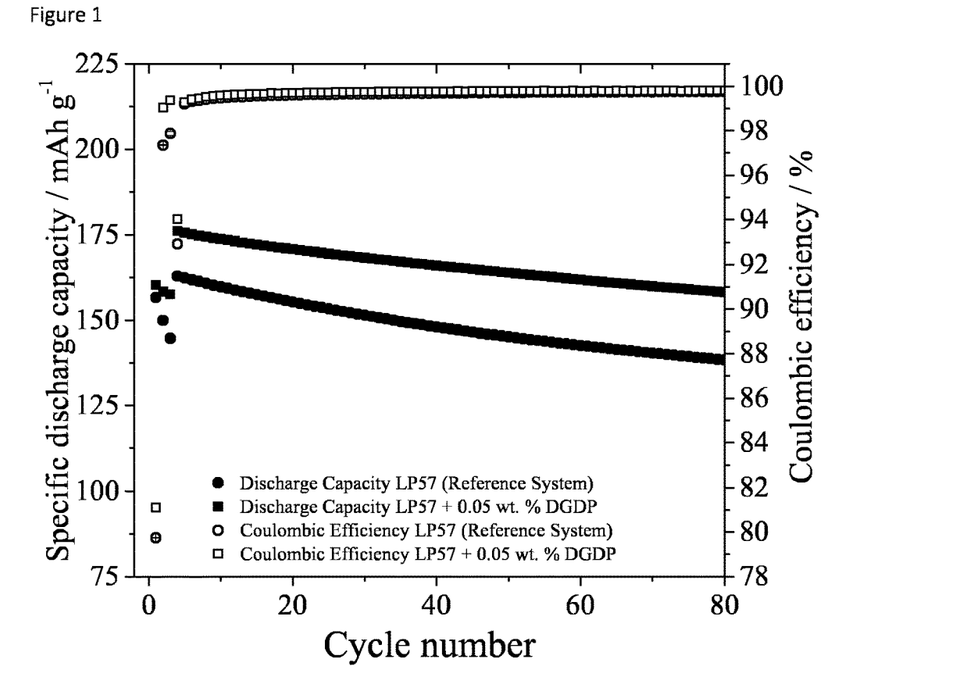
FIG. 1: Charge/discharge cycling stability data of the NCM523/graphite cells with 0.05 wt. % 3,3'-((diphenylgermanediyl)bis(oxy))dipropanenitrile (DGBP) in 1M LiPF$_6$ in EC/EMC 3:7 wt. % (LP57) by using a cell voltage of 4.30 V (cycles 1-3) and 4.55 V (from cycle 4) in comparison to the reference electrolyte (RE). Cut-off voltages: 2.80-4.55 V.
Figure 2:
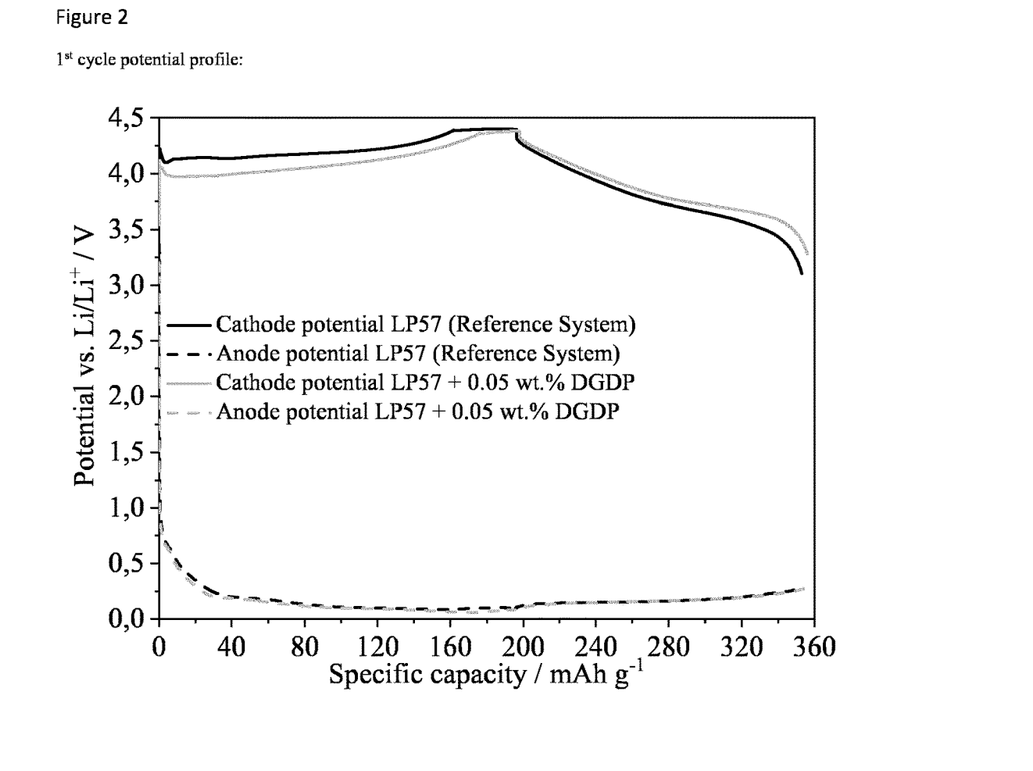
FIG. 2: Cathode and anode potential profiles for NMC532/graphite cells with RE and RE+0.05 wt. % DGDPin the 1st charge/discharge cycle. Cut-off cell voltages: 3.00-4.55 V.

The mean values as well as the standard deviation of three cells for the charge/discharge cycling performance of NMC111/graphite cells, with and without 0.05 wt. % DGDP as electrolyte additive, are shown in FIG. 1.

The additive concentration was set to 0.05 wt. % in terms of the total amount of electrolyte comprising lithium hexafluorophosphate in a solvent or solvent mixture to be consumed during the formation process and to form protective SEI (solid electrolyte interphase)/CEI-layers. Higher concentrations are in this case not necessary and in some cases even have a counter-productive effect on cell performance.

Already in the first three formation cycle, the cells with the DGDP-containing electrolyte show a higher discharge capacity compared to the RE-containing cell. However, both showed a similar first $C_{Eff}$. Thus, the reversible capacity improves and whereas there is no distinguishable improvement with respect to $C_{Eff}$ within the formation cycles by adding DGDP into the RE.

In the following cycles, at a charge/discharge rate of 0.5 C (1 C=200 mA g$^{-1}$), the DGDP-containing cells outperform the cells with RE, by strongly improving the capacity retention.

The improvement by DGDP on the long-term cycling performance is maintained after 80 cycles and becomes even more pronounced with higher cycle numbers.

According to the present invention, germanium organyl-based electrolyte additives, in particular 3,3'-((diphenylgermanediyl)bis(oxy))dipropanenitrile (DGDP), were shown to act as a highly effective cathode electrolyte interphase (CEI)—electrolyte additive for NCM cathodes in LIBs operated at high-voltage. With the use of only 0.05 wt. % DGDP, NCM523/graphite LIB cells showed a superior charge/discharge cycling performance upon cycling at high voltage (4.55 V), compared to the carbonate-based reference electrolyte. The capacity retention could be improved. Furthermore, DGDP is a very effective and therefore cost efficient compound for the application in NCM/graphite cells, as only 0.05 wt. % of DGDP are already effective.

The present invention provides a variety of different germanium organyl-based electrolyte additives that are accessible by variation of the substituents enabling to customize the electrochemical properties.

EXAMPLES

Example 1: Synthesis of Germanium Organyl-Based Electrolyte Additives

Example 1.1: Synthesis of 43,3'-((diphenylgermanediyl)bis(oxy))dipropanenitrile (DGDP)

1.) 5 mmol (0.34 ml) 3-hydroxypropionitriles were dissolved in 50 ml dry THF, cooled to −78° C. and 5 mmol n-BuLi (2.5 M n-BuLi in hexane, 2 ml) were added slowly over a period of 30 minutes. The cooling bath was then removed and stirred for a further 2 hours at room temperature.
2.) To 1.) 2.5 mmol (0.53 ml) Diphenylgermanium dichloride were slowly added at room temperature and stirred for a further 48 h at room temperature.
3.) The solvent was removed in a vacuum and a white solid remained as a residue. This residue was mixed with 100 ml toluene and then filtered. The filtrate was concentrated to 25 ml and stored at −25° C., forming colourless prisms with a yield of 600 mg. These were dried at 40° C. in a vacuum.

ESI-MS: theory: 368.06 M
measured: 391.05 M+Na+
$^1$H-NMR (300 MHz, CDCl$_3$, TMS): δ=7.72 (m, 4H, Ar—H), 7.56 (m, 2H, Ar—H), 7.51 (dd, 4H, Ar—H), 4.02 (t, 4H, CH$_2$), 2.63 (t, 4H, CH$_2$).

Example 2: Electrode and Electrolyte Preparation

The electrolyte preparation and storage as well as the cell manufacturing were carried out in an argon-filled glove box ($H_2O$ and $O_2$ contents<0.1 ppm). All indicated mixing ratios are based on the mass ratio (% by weight).

For the preparation of the additive electrolytes according to the invention, 3,3'-((diphenylgermanediyl)bis(oxy))dipropanenitrile (DGDP) was added to this electrolyte mixture. The proportion of the additive (A) indicated in % by weight refers to the electrolyte (E) with additive (A), not to the entire electrolyte mixture including additive, that is, W (A)=m (A)/(m (E)+m (A)).

The electrodes were prepared in a large scale in cooperation with the battery line of the MEET institute. The cathode contains 93 wt. % $LiNi_{0.5}Co_{0.2}Mn_{0.3}O_2$ (NCM-523; CATL), 4 wt. % carbon black (Super C65, Imerys) and 3 wt. % polyvinylidene difluoride (PVdF, Solef 5130, Solvay) as binder. N-methylpyrrolidone (NMP, ALDRICH) was used as dispersant. The $LiNi_{0.5}Co_{0.2}Mn_{0.3}O_2$ powder was sieved (75 μm) and dried under vacuum for 24 h at 60° C. to prevent agglomerates and remove residual moisture. PVdF and NMP were added into an air-tight container and homogenized over night by a shear mixer at 2500 rpm. Afterwards, carbon black and NCM-523 was homogenized to the solution and mixed for 1.5 h under low vacuum and water cooling. After optimization of viscosity the solid content reached 50%. The electrode paste was cast onto an aluminum foil (Evonik Industries) with an average mass loading of 1.5 mAh $cm^{-2}$.

The anode contains 94.5 wt. % graphite (FSNC-1; Shanshan Technology; D50=15.0±2.0 μm; BET surface area=1.3±0.3 $m^2$ $g^{-1}$), 1.0 wt. % carbon black (Super C65, Imerys), 2.25 wt. % styrene butadiene rubber (SBR, Lipaton SB 5521, Polymer Latex GmbH) and 2.25 wt. % sodium carboxymethyl cellulose (Na-CMC, Walocel CRT 2000 PPA 12, Dow Wolff Cellulosics)), demineralized water was used as a dispersant. Based on the viscosity the solid loading was optimized to 54%. The electrode paste was coated onto copper foil (Evonik Industries) with a mass loading of 2.7 mAh $cm^{-2}$. The electrodes were calendered to reach a density of 1.5 g $cm^{-3}$. For the LIB cell investigations, the capacity ratio between the NCM523 cathode and anode was set as 1:1.6, to avoid lithium metal plating at the graphite anode.

A mixture of ethylene carbonate (EC) and ethyl methyl carbonate (EMC) (3:7 by weight, Solvionic, purity:battery grade) containing 1 M $LiPF_6$ was used as reference electrolyte (RE; also referred to as "LP57"). DGDP was added into the reference electrolyte with the desired amount (0.05%) by weight ratio in an argon filled glove box.

Example 3: Cell Setup and Electrochemical Characterization

All electrochemical investigations were performed using three-electrode Swagelok cells in climatic chambers at 20° C. Lithium metal (Albemarle Corporation; purity: battery grade) was used as the reference electrode (REF; Ø=5 mm). A polypropylene nonwoven (Freudenberg 2190, 3 layers) was used as separator. Each cell contained in total 240 μL (160 μL+80 μL for REF) electrolyte and were assembled in an argon filled glove box.

Long-term charge/discharge cycling of full cells was evaluated by a battery tester Series 4000 (MACCOR). NMC532/graphite LIB cells were cycled in a voltage range from 2.80 V to 4.55 V with three formation cycles with a charge and discharge rate of 40 mA $g^{-1}$, equal to a C-rate of 0.2 C (based on the specific capacity of NCM523 at 4.55 V vs. Li/Li+, 200 mAh g-1, obtained from 3-electrode measurements), followed by subsequent cycles with a charge/discharge rate of 100 mA g-1 (corresponding to 0.5 C). Each charging step included a constant voltage step at 4.55 V until the current dropped below 0.05 C.

We claim:

1. A lithium battery comprising:
   an anode comprising an active anode material;
   a cathode comprising an active cathode material comprising lithium nickel manganese cobalt oxide ($LiNi_x$-$Co_yMn_{1-x-y}O_2$) (NCM) with each of x and y not including zero and x+y being smaller than 1;
   a separator separating the anode and the cathode, and an electrolyte wherein the electrolyte comprises a solvent or solvent mixture and lithium hexafluorophosphate,
   wherein
   the electrolyte further comprises a germanium organyl-based electrolyte additive, wherein the germanium organyl-based electrolyte additive includes 3,3'-((diphenylgermanediyl)bis(oxy))dipropanenitrile (DGDP) of formula 2 formula 2

2. The lithium battery according to claim 1, wherein the germanium organyl-based electrolyte additive further includes a compound of formula 1 wherein X is Ge; Y1 and Y2 are independently $(CH_2)_m$ with m being 0, 1 or 2; and $Z_1$ and $Z_2$ are independently selected from the group consisting of nitrile, a substituted or unsubstituted C6- to C14-aryl, and a substituted or unsubstituted C5-C12 heteroaryl with a heteroatom selected from O, N, and S, wherein an optional substituent for modifying the substituted or unsubstituted C6- to C14-aryl and/or the substituted or unsubstituted C5-C12 heteroaryl is selected from the group consisting of C1 to C9 alkyl, and C1 to C9 alkoxyl.

3. The lithium battery according to claim 1, wherein the germanium organyl-based electrolyte additive is selected from the group consisting of the following formulas 2 to 19, with X being Ge, and R being C1 to C9 alkyl, or C1 to C9 alkoxyl:

formula 2 formula 3 formula 4 formula 5 formula 6 formula 7 formula 8 formula 9 formula 10 formula 11 formula 12

-continued formula 13 formula 14 formula 15 formula 16 formula 17 formula 18 and

-continued formula 19 and a mixture thereof.

4. The lithium battery according to claim 1, wherein the active cathode material is selected from the group consisting of NCM with 0.3≤x<1.

5. The lithium battery according to claim 1, wherein, in terms of the total amount of electrolyte comprising lithium hexafluorophosphate in a solvent or solvent mixture, 0.01 to 10 wt.-%, or 0.1 to 5 wt.-%, or 0.2 to 1 wt.-%, or 0.25 to 0.75 wt.-% germanium organyl-based electrolyte additive.

6. The lithium battery according to claim 1, wherein the concentration of lithium hexafluorophosphate is in the range of 0.1 M to 2 M, or 0.5 M to 1.5 M, or 0.7 M to 1.2 M.

7. The lithium battery according to claim 1, wherein the solvent or solvent mixture is selected from an organic solvent or solvent mixture, and/or an ionic liquid.

8. The lithium battery according to claim 1, wherein the organic solvent or solvent mixture is selected from the group consisting of ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxalane, methylacetate and/or mixtures thereof.

9. The lithium battery according to claim 1, wherein the organic solvent mixture comprises a mixture from ethylene carbonate and at least one further solvent, or ethyl methyl carbonate, in a ratio in terms of weight parts of >1:99 to <99:1, or from >1:9 to <9:1, or from ≥3:7 to ≤1:1.

10. The lithium battery according to claim 1, wherein the electrolyte further comprises an additive selected from the group consisting of chlorethylene carbonate, fluorethylene carbonate, vinylene carbonate, vinylethylene carbonate, ethylene sulfite, ethylene sulfate, propane sulfonate, sulfite, dimethylsulfite and propylene sulfite, sulfate, butyrolactone optionally substituted with F, Cl or Br, phenylethylene carbonate, vinylacetate and trifluoropropylene carbonate.

11. The lithium battery according to claim 1, wherein the active anode material is selected from the group consisting of carbon, graphite, mixtures of silicon and carbon/graphite, silicon, tin, lithium-metal oxide, materials that form alloys with lithium, composites and mixtures thereof.

12. Use of a germanium organyl-based electrolyte additive as additive in a lithium battery as defined in claim 1 for enhancing one characteristic selected from the group consisting of reversible capacity, Coulombic efficiency ($C_{Eff}$), cyclic stability, capacity retention and combinations thereof.

13. A lithium battery comprising:
an anode including an active anode material;
a cathode including an active cathode material comprising lithium nickel manganese cobalt oxide (LiNi$_x$Co$_y$Mn$_{1-x-y}$O$_2$) (NCM) with each of x and y not including zero and x+y being smaller than 1;
a separator separating the anode and the cathode; and an electrolyte including
- a solvent or solvent mixture and lithium hexafluorophosphate, and
- a germanium organyl-based electrolyte additive selected from the group consisting of the following formulas 2 to 19, with X being Ge, and R being C1 to C9 alkyl, or C1 to C9 alkoxyl:

formula 2 formula 3 formula 4 formula 5 formula 6 formula 7 formula 8 formula 9 formula 10 formula 11 formula 12 formula 13 formula 14 formula 15 formula 16 formula 17 formula 18 formula 19 and a mixture thereof.

14. The lithium battery according to claim 13, wherein the active cathode material is selected from the group consisting of NCM with $0.33 \leq x < 1$.

15. The lithium battery according to claim 13, wherein, in terms of the total amount of electrolyte comprising lithium hexafluorophosphate in a solvent or solvent mixture, 0.01 to 10 wt.-%, or 0.1 to 5 wt.-%, or 0.2 to 1 wt.-%, or 0.25 to 0.75 wt.-% germanium organyl-based electrolyte additive.

16. The lithium battery according to claim 13, wherein the concentration of lithium hexafluorophosphate is in the range of 0.1 M to 2 M, or 0.5 M to 1.5 M, or 0.7 M to 1.2 M.

17. The lithium battery according to claim 13, wherein the solvent or solvent mixture is selected from an organic solvent or solvent mixture, and/or an ionic liquid.

18. The lithium battery according to claim 13, wherein the organic solvent or solvent mixture is selected from the group consisting of ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxalane, methylacetate and/or mixtures thereof.

19. The lithium battery according to claim 13, wherein the organic solvent mixture comprises a mixture from ethylene carbonate and at least one further solvent, or ethyl methyl carbonate, in a ratio in terms of weight parts of >1:99 to <99:1, or from >1:9 to <9:1, or from $\geq 3:7$ to $\leq 1:1$.

20. The lithium battery according to claim 13, wherein the electrolyte further comprises an additive selected from the group consisting of chlorethylene carbonate, fluorethylene carbonate, vinylene carbonate, vinylethylene carbonate, ethylene sulfite, ethylene sulfate, propane sulfonate, sulfite, dimethylsulfite and propylene sulfite, sulfate, butyrolactone optionally substituted with F, Cl or Br, phenylethylene carbonate, vinylacetate and trifluoropropylene carbonate.

* * * * *

UNITED STATES PATENT AND TRADEMARK OFFICE
CERTIFICATE OF CORRECTION

| | | |
|---|---|---|
| PATENT NO. | : 12,148,927 B2 | Page 1 of 1 |
| APPLICATION NO. | : 17/440085 | |
| DATED | : November 19, 2024 | |
| INVENTOR(S) | : Sven Klein et al. | |

It is certified that error appears in the above-identified patent and that said Letters Patent is hereby corrected as shown below:

In the Claims

At Column 22, Line 29 (Claim 14, Line 3), please delete "NCM with $0.33 \leq x < 1$" and insert --NCM with $0.3 \leq x < 1$-- therefor.

Signed and Sealed this
Seventeenth Day of December, 2024

Derrick Brent
*Acting Director of the United States Patent and Trademark Office*